(12) United States Patent
Minarovic

(10) Patent No.: US 7,915,894 B2
(45) Date of Patent: Mar. 29, 2011

(54) SERVICE TEE MARKER FIXTURE WITH CONCENTRIC ATTACHMENT SLEEVE

(76) Inventor: Joe T. Minarovic, Georgetown, TX (US)

( * ) Notice: Subject to any disclaimer, the term of this patent is extended or adjusted under 35 U.S.C. 154(b) by 686 days.

(21) Appl. No.: 11/847,912

(22) Filed: Aug. 30, 2007

(65) Prior Publication Data

US 2009/0058421 A1 Mar. 5, 2009

(51) Int. Cl.
*G01V 3/11* (2006.01)
*G01V 15/00* (2006.01)

(52) U.S. Cl. .......................................... 324/329; 324/67

(58) Field of Classification Search ........................ None
See application file for complete search history.

(56) References Cited

U.S. PATENT DOCUMENTS

| | | | |
|---|---|---|---|
| 4,767,237 A | 8/1988 | Cosman et al. | |
| 4,873,533 A * | 10/1989 | Oike | 343/744 |
| 4,947,012 A | 8/1990 | Minarovic | |
| 5,017,415 A | 5/1991 | Cosman et al. | |
| 6,049,279 A | 4/2000 | Minarovic | |
| 6,246,328 B1 * | 6/2001 | Parkinson et al. | 340/572.1 |
| 6,271,667 B1 | 8/2001 | Minarovic | |
| 7,391,324 B1 * | 6/2008 | Pflugrath et al. | 340/572.1 |
| 2003/0047226 A1 * | 3/2003 | Hill et al. | 138/104 |
| 2003/0231020 A1 * | 12/2003 | Yonezawa et al. | 324/326 |
| 2008/0190509 A1 * | 8/2008 | Cox | 138/96 R |

* cited by examiner

*Primary Examiner* — Jay M Patidar
(74) *Attorney, Agent, or Firm* — Jack V. Musgrove

(57) ABSTRACT

A service tee marker fixture comprises a disk marker and a cylindrical attachment sleeve fastened concentrically to the disk marker and constructed of a flexible material which provides a releasable friction fit with a service tee cap. For certain sleeve materials a stiffener plate is used to secure an end portion of sleeve adjacent to the disk marker. Detents are formed inside the attachment sleeve to grip matching ribs on the cap. An integrally formed inwardly-extending annular flange at an open end of the sleeve helps retain the sleeve on the cap. When installed the wire coil is horizontal and the marker shields the tee, and is further centered over a centerline of the main pipe. A novel method is also disclosed for using the service tee marker fixtures to survey and locate service line end points.

15 Claims, 4 Drawing Sheets

SERVICE TEE MARKER FIXTURE WITH CONCENTRIC ATTACHMENT SLEEVE

BACKGROUND OF THE INVENTION

1. Field of the Invention

The present invention generally relates to devices used to mark and locate obscured objects, and more particularly to an electronic marker used to locate features of a buried conduit such as a service tee or tap of a gas distribution line.

2. Description of the Related Art

Buried conduits are employed for supplying a wide variety of utilities, including pipelines for gas, water and sewage, and cables for telephone, optical fiber, power and television. It often becomes necessary to locate defective or damaged cables, pipes, etc., in order to repair or replace them. Conversely, it is important to know with as much accuracy as possible the approximate vicinity of such items in order to avoid disturbing them when digging or excavating for other purposes. Above-ground marking devices may be installed immediately after the conduit is buried, but they are often lost, stolen, or destroyed after a short period of use. Therefore, it is common to use underground marking devices or systems to enable the later location of a section or feature of an underground utility.

In the past, three different approaches have been used to indicate the presence of buried conduits, namely, warning tapes, trace wires, and electronic marker systems. A warning tape is simply a band of plastic which is placed above the conduit before burial. These tapes are used to alert the excavation team of the presence of the conduit before any damage thereto might occur. As the backhoe or other mechanical digger excavates the site, it will hopefully uproot a portion of the warning tape prior to contact with the conduit. The primary disadvantage of (non-metallic) warning tapes is that they cannot be detected by any surface instrumentation.

A single trace wire is sometimes buried with a utility line. The trace wire is used as a conductor for an AC signal which is applied to the wire at one accessible end, and then acts as an antenna and radiates an electromagnetic field above ground along its entire length. The electromagnetic field may be detected with an appropriate receiver, and the underground path of the line thereby determined. The earliest cable locators used a single sensor which detects a single null or peak (depending upon the orientation of the sensor) as the unit passes near the cable. Many later devices use two or more sensors that combine the signals to provide an indication of conductor proximity. The most common sensors are ferrite-core antennas, i.e., inductors. Although the conduit itself may act as a conductor (i.e., when steel pipe or copper wire cabling is used), most conduits are non-conductive and therefore require a trace wire. There are three significant disadvantages in the use of a trace wire. First of all, it is necessary to provide above ground access to the trace wire in order to couple the AC signal thereto. Secondly, if a break occurs in the wire (due to excavation, or natural causes such as corrosion, earth movement or burrowing animals), then the wire becomes useless. Finally, the trace wire is too thin to imprint a warning message thereon, precluding any visual warning. Additionally, a receiver cannot distinguish the trace wire from any other conductor in the vicinity.

Electronic marker systems for locating buried objects are known in the art, and generally consist of two types, namely, active and passive markers (transponders). Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means.

There are several kinds of passive transponders for different applications. These include small, near-surface markers for locating objects just inches below the surface, medium size or mid-range markers, full-range markers for locating more deeply buried objects, and self-aligning markers such as the so-called ball marker which supports the marker coil horizontally, regardless of the orientation of the housing. There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection. All of these markers generally float around the underground feature in the soil, and are subject to soil movement.

Electronic markers, as well as warning tapes, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is electronically coded by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. These frequencies have been designated by convention, and are not meant to be restrictive.

One problem associated with using passive or active transponders for remote identification of buried utility structures is that the transponder must be properly oriented to maintain the coil axis in a generally vertical position. Current methods for locating service drops are highly dependent on field crews for correct placement of transponders for accurate locating. Even with correct placement procedures, movement can occur in a filled ditch or hole as a result of loose unpacked soil, freeze/thaw cycling, water erosion, and other causes. If the coil axis orientation deviates from the vertical, then the craftsperson searching for the marker will sense a peak signal at a position which does not correspond to the buried transponder, resulting in a mislocate, which can be costly if the excavation equipment damages any part of the underground utility due to the error. Although markers can be attached to the utility structure in the proper orientation using clamps, straps, tape, adhesive, etc., subsurface movement can still result in angular displacement of the markers.

While the aforementioned ball marker overcomes the orientation problem, it still has certain disadvantages. For example, while angular displacement of the coil axis is avoided, there is still the possibility of translational movement of the housing itself, as the ball marker is not attached to the buried conduit. Such movement is especially troublesome when marking a specific point, such as a service tee or tap, as opposed to simply marking a portion of the length of a conduit. It would, therefore, be desirable to devise an improved method of accurately marking and locating a service tee or tap without dependency on craft skill. It would be further advantageous if the method could allow the marker to be affixed to the buried conduit in such a manner that the marker location and orientation resists any change from movement of the surrounding soil, e.g., during backfill.

SUMMARY OF THE INVENTION

It is therefore one object of the present invention to provide an improved method of attaching an electronic marker to a specific point along a buried conduit such as a service tee or tap in a gas distribution line.

It is another object of the present invention to provide such a method which reliably maintains the electronic marker at the proper location and orientation, but may still be easily installed.

It is yet another object of the present invention to provide a method of locating service lines connected to a main line using an electronic marker system.

The foregoing objects are achieved in a service tee marker fixture generally comprising a circular disk marker which produces an electronic locating signal, a cylindrical attachment sleeve fastened concentrically to the disk marker and constructed of a flexible material having a Shore D hardness of 40-75, and a stiffener plate securing an end portion of the attachment sleeve adjacent to a lower surface of the disk marker. The disk marker is preferably a passive electronic marker tuned to a known frequency, which produces a locating signal in response to an activation signal transmitted at the known frequency. The flexible material of the attachment sleeve may be elastomeric, and the attachment sleeve is preferably permanently affixed to the disk marker using, e.g., a rivet. The sleeve advantageously provides a releasable friction fit with a service tee cap. Detents are formed along an inner surface of the attachment sleeve which extend in a direction parallel with the sleeve axis, i.e., vertical, to grip matching ribs on the cap. Means may be provided to releasably retain the attachment sleeve to the service tee cap, such as an integrally formed inwardly-extending annular flange at an open end of the sleeve. The wire coil of the marker is preferably flat and horizontally oriented, acting as a physical shield to protect the tee when installed.

When the service tee is attached to the main pipe its access port is vertically aligned and centered over a centerline of the pipe, and the marker fixture is attached such that the inner wire coil is concentric with and lying above the access port, thereby pinpointing the location of the pipe center. Passive markers can be energized using a trace wire adjacent to the main pipe with portions of the trace wire wound around the access ports in loops which are aligned with the wire coils of the markers.

The pinpoint accuracy of the marker location is also convenient to use for further surveying of the paths of the main line and any service lines. The service tees have a service line attachment which extends generally orthogonal to the axis of the main line, so once a service tee marker fixture is located and the main line direction is determined, for example using a parallel roadway as a reference, another electronic marker positioned at the end point of the buried service line can be found by searching along a path orthogonal to the main line direction from the service tee marker fixture location. Alternatively the main line can be more accurately drawn by searching along the main line direction from the first service tee marker fixture location to find a second service tee marker fixture also located over the centerline of the main line. These two locations are the two points defining a line for this section of pipe. The end point of the second buried service line is then similarly found by searching along another path orthogonal to the main line direction from second service tee marker fixture location. The second service tee may be located at a known interval from the first service tee and thereby indicate that the orthogonal paths extend toward a first side of the roadway, and a third service tee marker fixture found along the main line path at an irregular interval may indicate that its service line extends along a further path orthogonal to the main line direction but extending toward an opposite side of the roadway.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
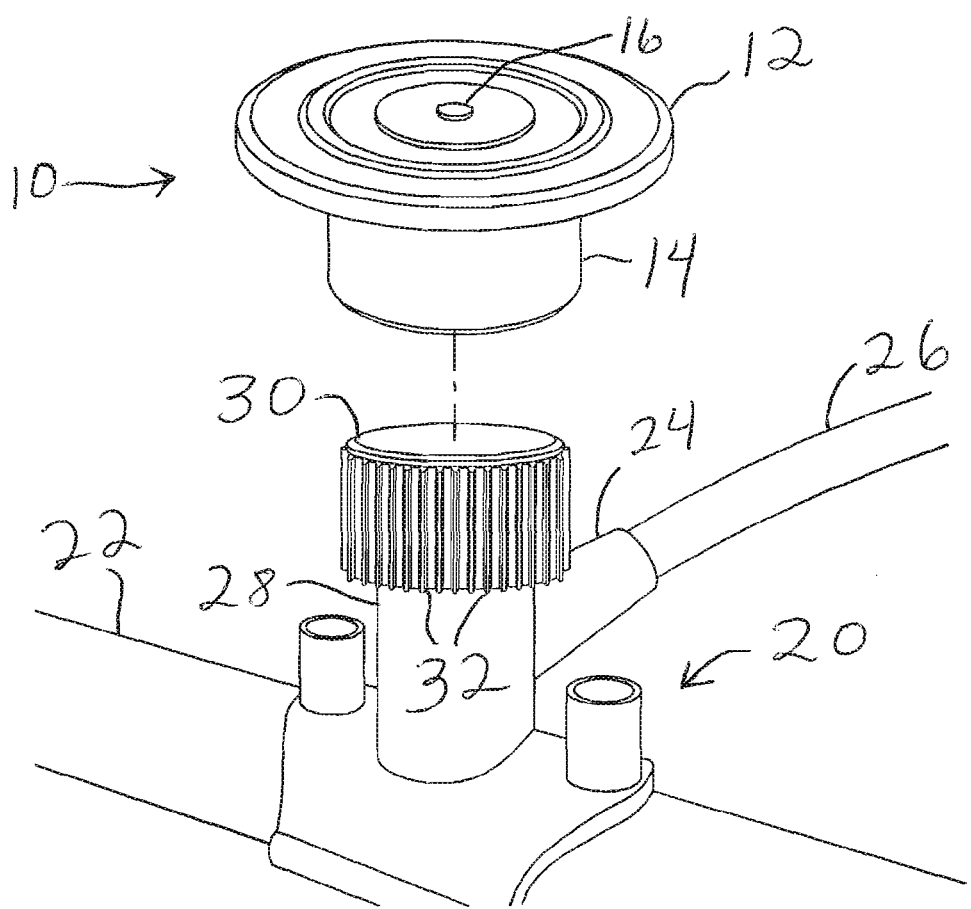
FIG. 1 is a perspective view of one embodiment of the service tee marker fixture of the present invention shown as it is being placed on the cap of a service tee of a buried pipe.
Figure 2:
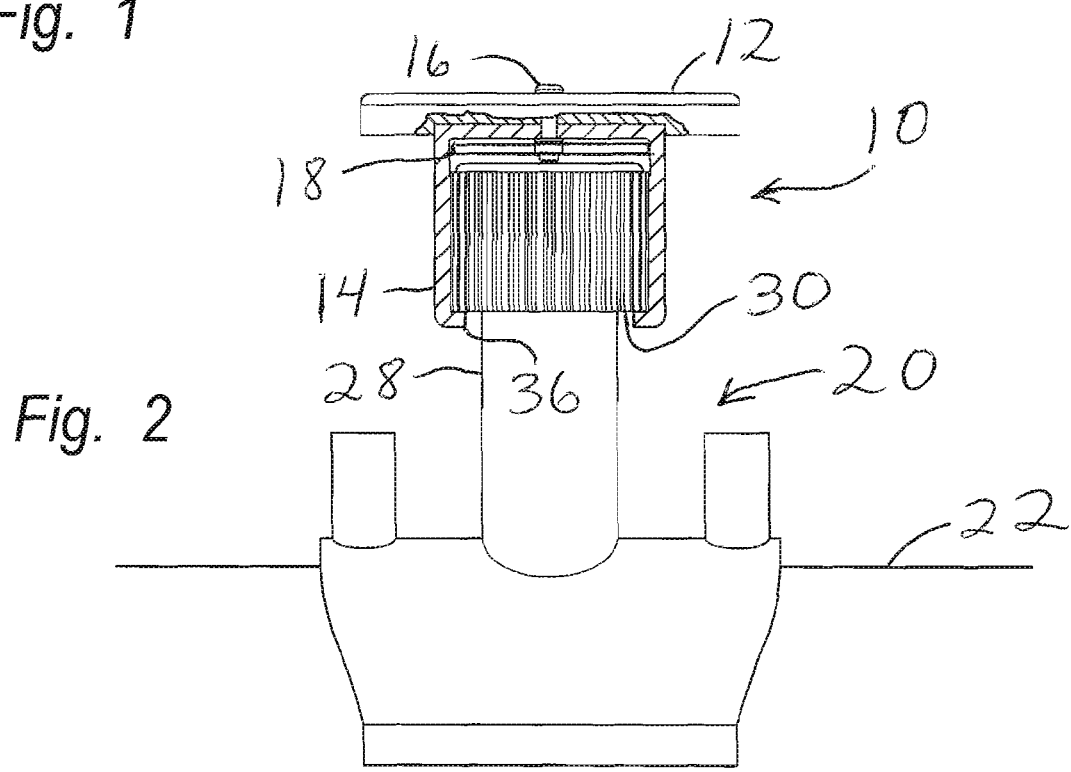
FIG. 2 is a side elevational view of the service tee marker fixture of FIG. 1 shown attached to the service tee cap.
Figure 3:
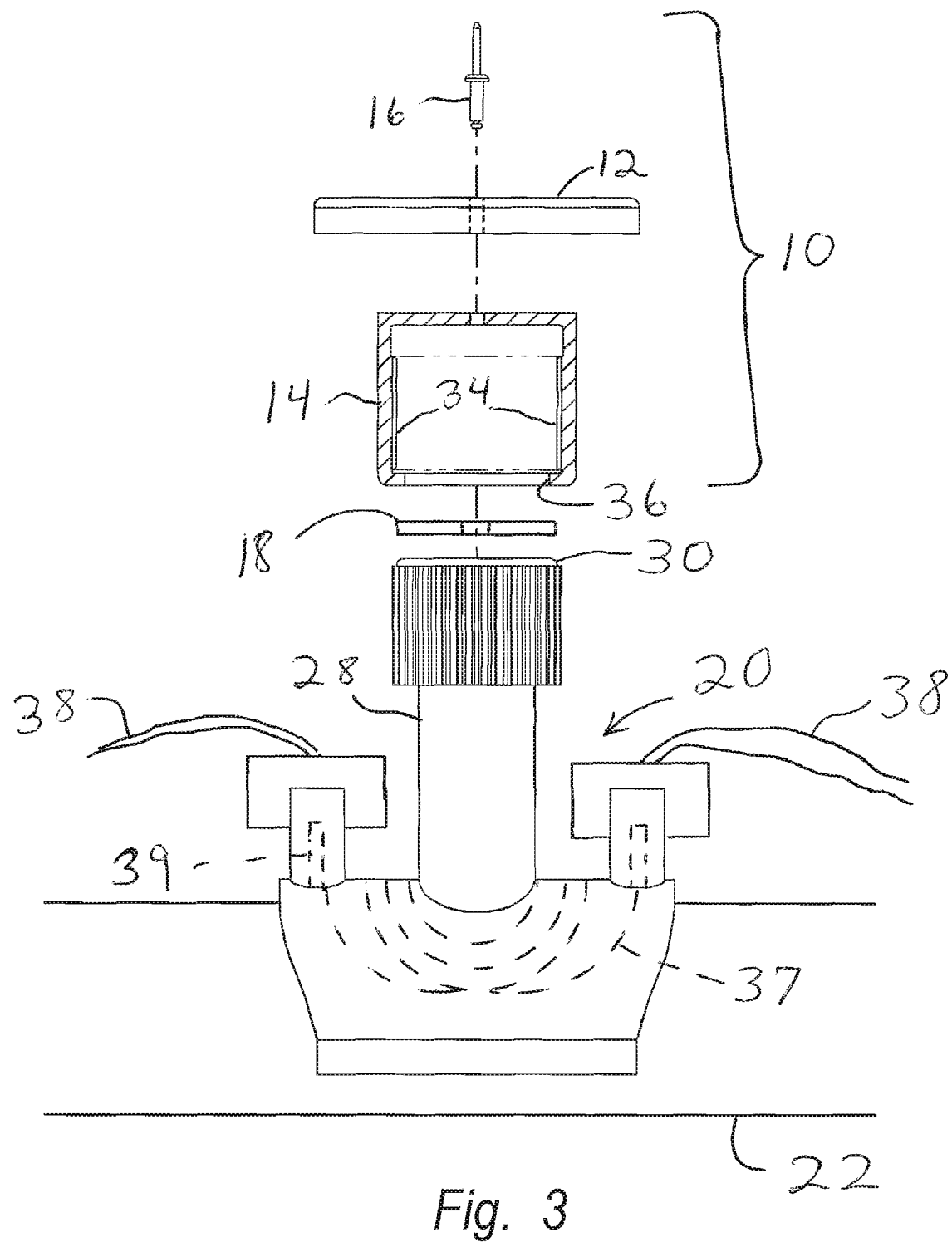
FIG. 3 is an exploded side view of the service tee marker fixture of FIG. 1.

With reference now to the figures, and in particular with reference to FIGS. 1-3, there is depicted one embodiment 10 of a service tee marker fixture constructed in accordance with the present invention. Service tee marker fixture 10 is generally comprised of a disk marker 12 and an attachment sleeve 14. Attachment sleeve 14 may be formed integrally with the housing of disk marker 12, but it is preferably a separately fabricated component which is permanently affixed to disk mark 12 using a rivet 16 which passes through the center of disk marker 12. In the embodiment wherein sleeve 14 is made of a pliant material, a stiffener plate 18 may be secured by rivet 16 to forcibly maintain the closed end portion of attachment sleeve 14 contacting disk marker 12 in a flattened state. Other means may be provided to fasten sleeve 14 to disk marker 12, such as bolts, sonic welding or adhesives; alternatively, means may be provided to releasably attach sleeve 14 to disk marker 12, such as a stud formed in sleeve 14 which mates with a bayonet-style latch in disk marker 12.

In the illustrative embodiment, disk marker 12 is a generally circular, passive electronic marker having a housing about 4¾" in diameter, and ⅜" maximum thickness. The housing is formed of any durable material, preferably a polymer such as high-density polyethylene or polyester. The interior of disk marker 12 contains a wire coil and capacitor electrically connected to form a resonant LC circuit. Marker 12 is thus activated by radiating a signal into the ground in the area where the marker is expected to be found, using an above-ground transmitter unit. Marker 12 accepts energy from the emitted signal within its bandpass and stores it during the transmission cycle and, when the transmission cycle ends, marker 12 re-emits the energy at the marker's resonant frequency in a nominal range of five feet which may be detected by a receiver unit. Marker 12 may operate on a standard frequency, e.g., 83.0 kHz for the gas industry. While the following description contemplates a passive transponder, the invention could alternatively use an active (i.e., battery-powered), multifunction or intelligent transponder.

Attachment sleeve 14 is generally cylindrical in shape, concentrically located with disk marker 12, and in the exemplary embodiment has a 2⅜" inner diameter to tightly grip around a fitting of similar size, is 1½" high, and has walls 1/16" thick. Attachment sleeve is formed of an elastomeric or other resilient, flexible material having a Shore D hardness in the range of 40-75. A preferred material is low-density polyethylene having a hardness of about 46. Stiffener plate 18 is constructed of a harder, rigid material such as ⅛" thick polyvinyl chloride.

Marker fixture 10 is advantageously used to pinpoint specific features or locations along a buried conduit, and is illustrated as marking a service tee 20 of a main gas distribution line (plastic pipe) 22. Service tee 20 has a service line connection 24, extending horizontally and perpendicular to the length of main line 22, which is connected to a local service line 26. Service tee 20 also has an access port or valve in a vertically-extending pipe section 28 sealed by a screw-on cap 30 having an interior, greased O-ring. The outer diameter of cap 30 is approximately equal to the inner diameter of sleeve 14. Cap 30 may have vertical ribs 32 or other protrusions to assisting in gripping and rotating the cap. In such a case, the inner surface of attachment sleeve 14 may have matching detents or grooves 34 which mate with ribs 32 and resist relative rotation of sleeve 14 and cap 30, i.e., the detents extend vertically or parallel to the longitudinal axis of attachment sleeve 14. Attachment sleeve further preferably has retention means to resist removal of sleeve 14 from cap 30. In the illustrative embodiment the retention means is a lower annular flange 36 integrally formed with attachment sleeve 14 at the open end which extends inwardly so as to latch around the bottom lip of cap 30. Other means may be provided to retain sleeve 14 on cap 30, such as clamps, straps, cable ties, etc. While annular flange 14 resists removal of sleeve 14 from the service tee due to the flexible nature of the sleeve material, marker fixture 10 is still releasable from the tee and so may be detached and reused elsewhere if desired. The above-noted hardness values provide an optimum balance for reliably securing the sleeve to the cap and retaining it by the annular flange, while still allowing it to be releasable.

Service tee 20 is attached to main line 22 (using adhesives, sonic welding, plate welding or electrofusion) such that the pipe section 28 extends generally vertically (plumb) and is also centered over main line 22. Accordingly, once installed disk marker 12 is oriented generally horizontally which is important to avoid a possible mislocate of the marker and, by the concentric geometry of cap 30, sleeve 14 and marker 12, marker fixture 10 accurately pinpoints the centerline of main line 22. This configuration is maintained during backfill and thereafter, regardless of subsurface soil movement, since sleeve 14 provides a friction fit with cap 30 and maintains marker 12 in the proper orientation. Although the electronic marker could be made with a different shape, such as a rod-shaped ferrite-core marker that is vertically disposed, the flat, horizontal marker has the further advantage of acting as a physical shield to protect tee 20.

If service tee 20 is attached to main line 22 by electrofusion, then the heating coil 37 embedded in the base of service tee 20 may also be used to energize the coil with marker 12 as seen in FIG. 3. Wires 38 are connected to the terminals 39 of heating coil 37, and a search signal at the resonant frequency of marker 12 is injected into wires 38. Since heating coil 37 is laterally centered within service tee 20, it is concentric with the coil in marker 12 and accordingly the signal in heating coil 37 will electromagnetically induce a signal in marker 12.

Figure 4:
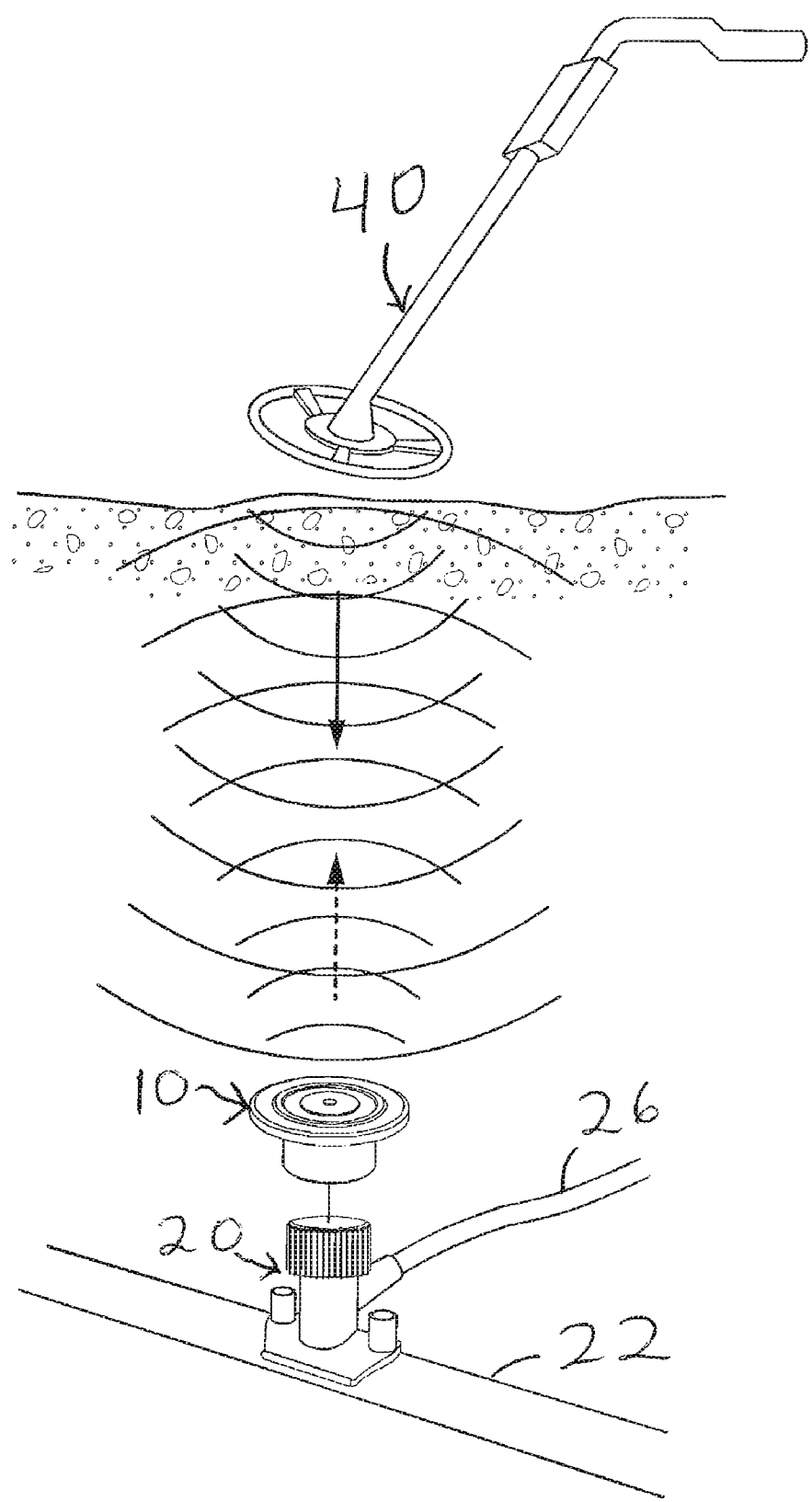
FIG. 4 is a pictorial representation of the locating of the service tee of the buried pipe using a transceiver to detect the electronic marker in the service tee marker fixture.

Referring now to FIG. 4, after installation and burial marker fixture 10 is located using an above-ground locator (transceiver) 40 which includes both a transmitter unit for emitting the stimulating resonant signal and a receiver unit for detecting the return signal from disk marker 12. The return signal strength increases as locator 40 gets nearer to the buried marker. Locator 40 preferably uses peak-null-peak detection, rather than null-peak-null detection, for more accurate location. Once the marker has been located above ground, a crew can hand dig to the buried service tee, and remove marker fixture 10 if desired. After accessing service tee 20, marker fixture 10 can be replaced onto cap 30 for future use. As noted above the exemplary disk marker 12 has a nominal five foot range but different markers (larger or with different windings/capacitors) could be used to provide a deeper range.

Figure 5:
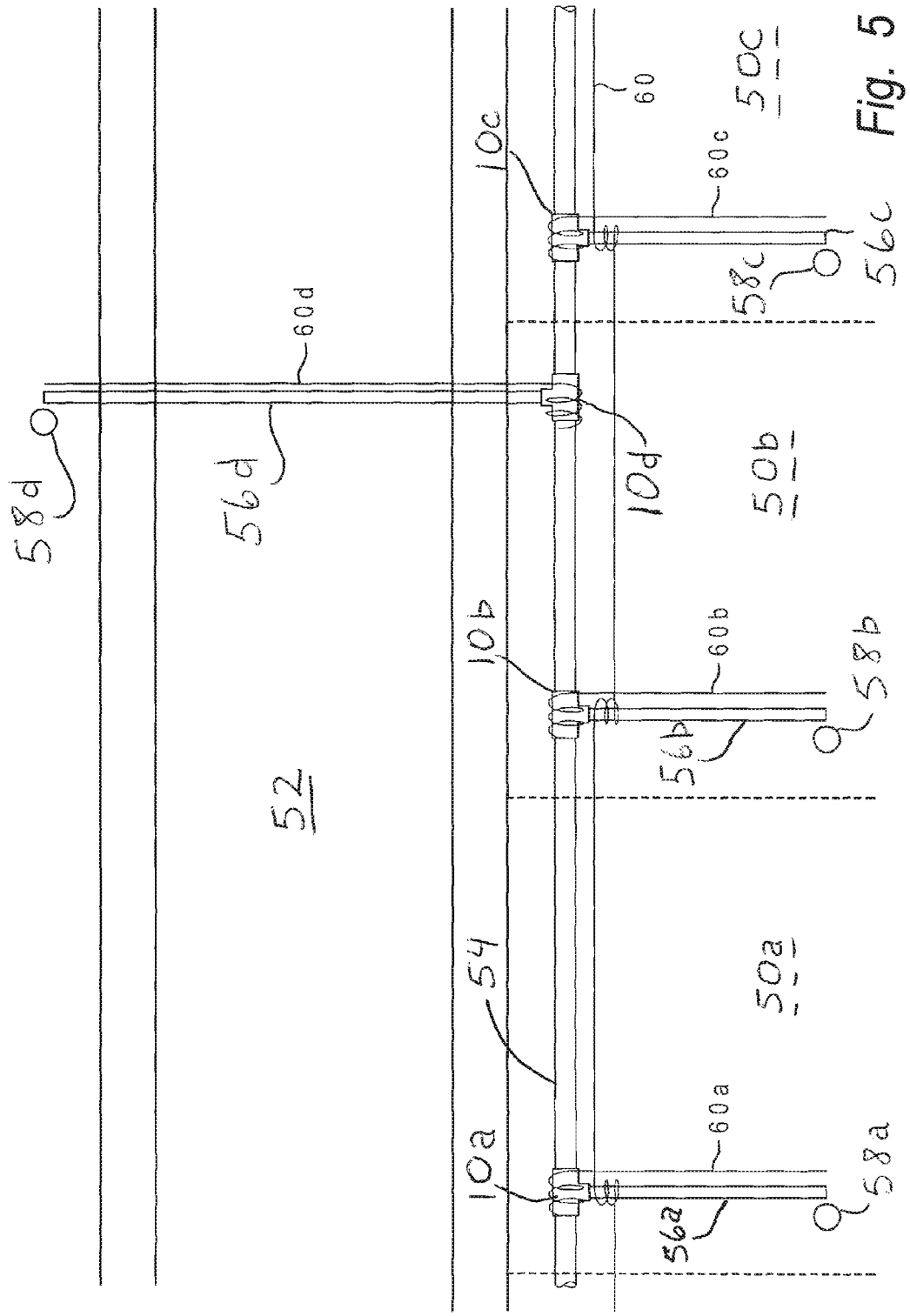
FIG. 5 is a plan view of a street layout illustrating a gas distribution installation having multiple marker fixtures for locating tees of a main pipe and endpoints of service lines.

A system of marker fixtures 10 may further be used to locate end points of service lines without digging at the service tees. An exemplary implementation of such a system is shown in FIG. 5 which is a plan view of a subdivision (commercial or residential) having lots 50a, 50b, and 50c along a roadway 52. A main distribution line 54, such as a gas line, is buried underground and runs the length of the lots. Service tees of main line 54 at each lot are marked by marker fixtures 10a, 10b, and 10c at regular or otherwise known intervals. Each service tee has a buried service line 56a, 56b, 56c extending into the respective lot, at a generally 90° angle with respect to the axis of main line 54. The ends of the service lines are further marked by other electronic markers 58a, 58b, 58c which may for example be disk markers buried separate from the service lines or end-cap markers affixed to the end lines (such as that described in U.S. Pat. No. 6,049,279). Although only three lots are shown, those skilled in the art will appreciate that the number of tees or taps may be much higher, and also that different sections of roadway need not be perfectly straight but locally will still provide a substantially linear direction for that section of main line 54.

After the initial installation, marking and burial of main line 54 and service lines 56, a builder will need to find the locations of the ends of service lines 56 to provide utility connections. One benefit of the present invention is the straightforward manner in which the service line end points are found. According to the preferred method, the craftsperson first need locate only one of the service tee marker fixtures 10 lying along main line 54. This may be accomplished by beginning at a boundary of the first lot 50*a* and sweeping the area proximate roadway 52 with a locator 40 to pinpoint a disk marker 12 as depicted in FIG. 4. The general vicinity of the marker may also be determined according to a previous survey or previously recorded GPS (global positioning system) coordinates. Once the first marker fixture 10*a* is located, the craftsperson proceeds from that marker directly along a path which is generally parallel to roadway 52 until the next marker fixture 10*b* is located. The craftsperson will have some general knowledge of the relative locations of the marker fixtures based on any previous survey showing the regular or otherwise known intervals between service tees. After locating the second marker fixture 10*b*, the craftsperson can construct a line (virtually or physically) using the first two marker fixtures since they lie accurately along the centerline of main line 54. This line is then used as the path to continue with locator 40 to find all of the remaining service tees along this section of main line 54. The service tee locations can be marked with a stake or flag if desired so that a later crew can access the tees to turn on the valves.

Once a service tee has been located, the craftsperson can find the end point of the corresponding service line by moving locator 40 along a path that is orthogonal to the axis of main line 54 from the respective service tee. For the marker fixtures 10*a*, 10*b*, 10*c* located at the known intervals, the orthogonal path extends away from the roadway on the same side as main line 54, i.e., in the example of FIG. 5 further into lots 50*a*, 50*b* and 50*c*. The craftsperson moving along this path will then find the additional end point markers 58, and a hole is dug at this location to attach the utility connection to the service line. If a service tee marker fixture such as 10*d* is found along the path of main line 54 at a location that does not correspond to the regular interval, that location may be deemed to correspond to a service tee for a service line 56*d* which extends oppositely, i.e., under roadway 52 toward a side opposite main line 54, in which case the craftsperson moves along this opposite orthogonal direction to locate the marker 58*d* at the end point.

An alternative method for energizing each marker 12 along main line 54 uses a primary trace wire 60. Trace wire 60 is buried adjacent main line 54 and is wound around each pipe stem 28 just under the respective marker fixture 10. A bobbin attachment around the pipe stem can further optionally be used to keep the loop in a tight coil. Each loop of wire thus has a center which is generally aligned with the coil inside disk marker 12. A signal sent by a transmitter at either end of trace wire 60 at the resonant frequency of disk marker 12 will activate the marker via inductive coupling and allow aboveground detection using only a receiver unit. The system may further utilize secondary trace wires 60*a*, 60*b*, 60*c*, 60*d* which similarly have one end looped around a service tee pipe stem (to inductively couple with a loop in primary trace wire 60) and follow the paths of the respective service lines 56*a*, 56*b*, 56*c*, 56*d*.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the drawings illustrate use of the invention for marking a service tee, it has wider application for marking other features such as valves, service stubs, pipe repair points, electrofusion joints, squeeze points, etc. It is therefore contemplated that such modifications can be made without departing from the spirit or scope of the present invention as defined in the appended claims.

What is claimed is:

1. An electronic marker fixture for marking the location of a feature of a buried conduit, comprising:
   a generally circular disk marker which produces an electronic locating signal;
   a generally cylindrical attachment sleeve fastened at one end concentrically to said disk marker, said attachment sleeve being adapted to attach to a fitting of the buried conduit, being constructed of a flexible material having a Shore D hardness of 40-75, and having a diameter which is smaller than a diameter of said disk marker; and
   a stiffener plate securing an end portion of said attachment sleeve adjacent to a surface of said disk marker.

2. The electronic marker fixture of claim 1 wherein the flexible material of said attachment sleeve is elastomeric.

3. The electronic marker fixture of claim 1 wherein said attachment sleeve is permanently affixed to said disk marker.

4. The electronic marker fixture of claim 1 wherein said attachment sleeve has a longitudinal axis, an inner surface, and detents formed along said inner surface which extend in a direction parallel with the longitudinal axis.

5. The electronic marker fixture of claim 1 wherein said disk marker is a passive electronic marker tuned to a known frequency, which produces the locating signal in response to an activation signal transmitted at the known frequency.

6. The electronic marker fixture of claim 1 further comprising means for retaining said attachment sleeve to the fitting of the buried conduit.

7. An electronic marker fixture for marking the location of a feature of a buried conduit, comprising:
   a generally circular disk marker which produces an electronic locating signal; and
   a generally cylindrical attachment sleeve fastened at one end concentrically to said disk marker, said attachment sleeve being adapted to attach to a fitting of the buried conduit, being constructed of a flexible material, having an integrally formed inwardly-extending annular flange at an open end thereof, and having a diameter which is smaller than a diameter of said disk marker.

8. The electronic marker fixture of claim 7 wherein the flexible material of said attachment sleeve is elastomeric.

9. The electronic marker fixture of claim 7 wherein said attachment sleeve is permanently affixed to said disk marker.

10. The electronic marker fixture of claim 7 wherein said attachment sleeve has a longitudinal axis, an inner surface, and detents formed along said inner surface which extend in a direction parallel with the longitudinal axis.

11. The electronic marker fixture of claim 7 wherein said disk marker is a passive electronic marker tuned to a known frequency, which produces the locating signal in response to an activation signal transmitted at the known frequency.

12. The electronic marker fixture of claim 7 wherein the flexible material of said attachment sleeve has a Shore D hardness of 40-75, and further comprising a stiffener plate securing an end portion of said attachment sleeve adjacent to a surface of said disk marker.

13. A fixture for electronically marking a service tee of a plastic pipe, comprising:
   a generally flat, circular disk marker which produces an electronic locating signal;
   a generally cylindrical attachment sleeve permanently affixed at one end to said disk marker and concentric therewith, said attachment sleeve being constructed of a flexible material having a hardness of a Shore D hardness of 40-75, and having a longitudinal axis, an inner surface, detents formed along said inner surface which extend in a direction parallel with the longitudinal axis, an integrally formed inwardly-extending annular flange at an open end thereof, and a diameter which is smaller than a diameter of said disk marker; and a stiffener plate securing a closed end portion of said attachment sleeve adjacent to a lower surface of said disk marker.

14. The fixture of claim 13 wherein the flexible material of said attachment sleeve is elastomeric.

15. The fixture of claim 13 wherein said disk marker is a passive electronic marker tuned to a known frequency, which produces the locating signal in response to an activation signal transmitted at the known frequency.

* * * * *